July 1, 1941.  C. G. ABBOT  2,247,830
SOLAR HEATER
Filed July 7, 1938  2 Sheets-Sheet 1

Inventor
Charles G. Abbot.
By Cameron, Kerkam + Sutton
Attorneys

July 1, 1941.   C. G. ABBOT   2,247,830
SOLAR HEATER
Filed July 7, 1938   2 Sheets-Sheet 2
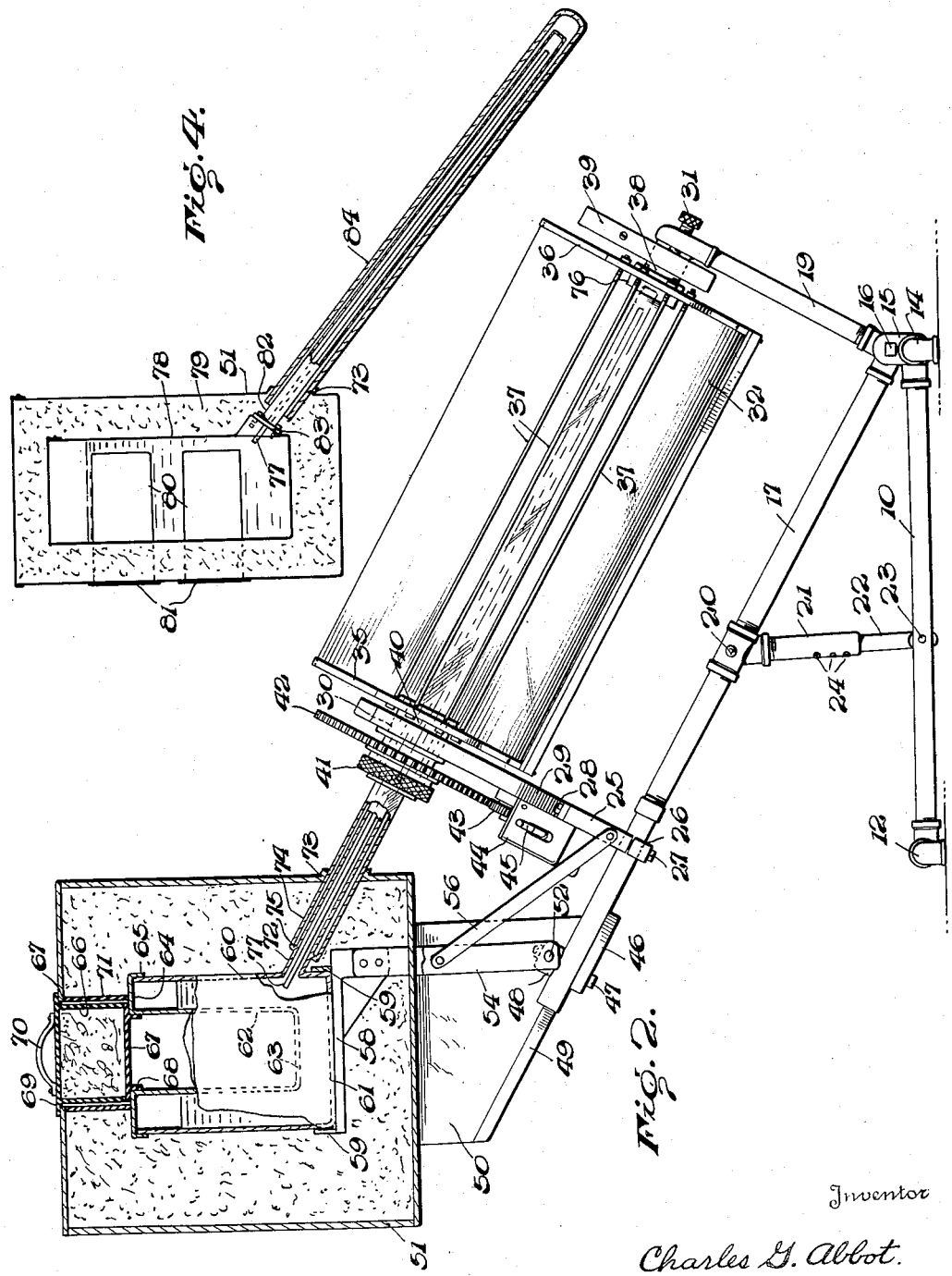
Inventor
Charles G. Abbot.
By Cameron, Kerkam & Sutton
Attorneys Patented July 1, 1941

2,247,830

UNITED STATES PATENT OFFICE 2,247,830

SOLAR HEATER

Charles G. Abbot, Washington, D. C.

Application July 7, 1938, Serial No. 217,980

5 Claims. (Cl. 126—271)

This invention relates to heaters and more particularly to heaters deriving their heat energy from solar radiations. Even more particularly this invention relates to indirect solar heaters, that is to solar heaters in which the heat collected from solar rays is conveyed some distance from the heat collecting element to the heat utilizing element.

Generally speaking, my invention comprises a solar heater in which an optical element designed to concentrate solar rays at a linear focus is preferably mounted with its axis and focal line parallel to the axis of the earth, and has a heater element lying in its focal line, the heater element being filled with a liquid stable at high temperatures and which may be highly absorptive of sun rays. The heater element is in communication with a cooker or other heat utilizing element located above the upper end thereof and has a smaller tube located within the heater element, and extending from adjacent the lower end thereof upwardly into the heat utilizing element, so that heat collected by the liquid in the heater element may be carried convectionally into said utilizing element and returned therefrom by gravitation. Said optical element is preferably arranged to rotate about its axis and the focal line of the heater element at a rate equal to the rate of apparent movement of the sun.

It is accordingly an object of the present invention to provide a novel solar heater in which the heat from solar rays is efficiently collected and conveyed some distance from the heat collecting element to the heat utilizing element.

Another object of this invention is to provide a novel solar heater in which a heat absorbing liquid is used to collect solar rays and by simple and compact provisions is caused to flow by expansion to the heat utilizing element and is then returned therefrom by gravitation.

Another object of my invention is to provide a solar heater having a novel heater element lying in the focus of the mirror which collects the solar rays.

Another object of my invention is to provide a solar heater with a novel heater element filled with a heat absorbing liquid and having simple and compact means of communication with a heat utilizing element.

Another object of my invention is to provide a solar heater having a novel heater element lying in the focus of a mirror and filled with a heat absorbing liquid, said heater element being in communication with a heat utilizing element and having an internal conduit extending from adjacent the lower end of the heater element into the heat utilizing element to afford a means of return for the cooled liquid from the heat utilizing element.

Another object of my invention is to provide a novel solar heater which may be made of any desired small size without decreasing its efficiency.

Another object of my invention is to provide a novel solar heater which is highly efficient, compact, cheap to manufacture, durable, and easily used by the inexperienced.

Other and further objects of my invention will appear as the description thereof proceeds.

The solar heater of the present invention is capable of receiving a variety of expressions in many differing embodiments and a wide range of sizes. For the purposes of illustration two embodiments of the present invention are shown in the accompanying drawings, but it is to be expressly understood that these two embodiments are shown in the drawings and described hereafter for purposes of illustration only, and are not to be construed as limitations to the present invention, reference being had to the appended claims to determine the scope of the present invention.

In the accompanying drawings Fig. 1 is a perspective view as seen from the rear of one embodiment of my novel solar heater, showing a solar heater of relatively small size;

Fig. 2 is a side elevation of the embodiment of Fig. 1 with a portion thereof in section to show the relation of the several parts;

Fig. 4 is a sectional view of another embodiment of my solar heater in the form of a cooker having a larger cooking capacity than that of the embodiment of Fig. 1.

Figures 1, 3:
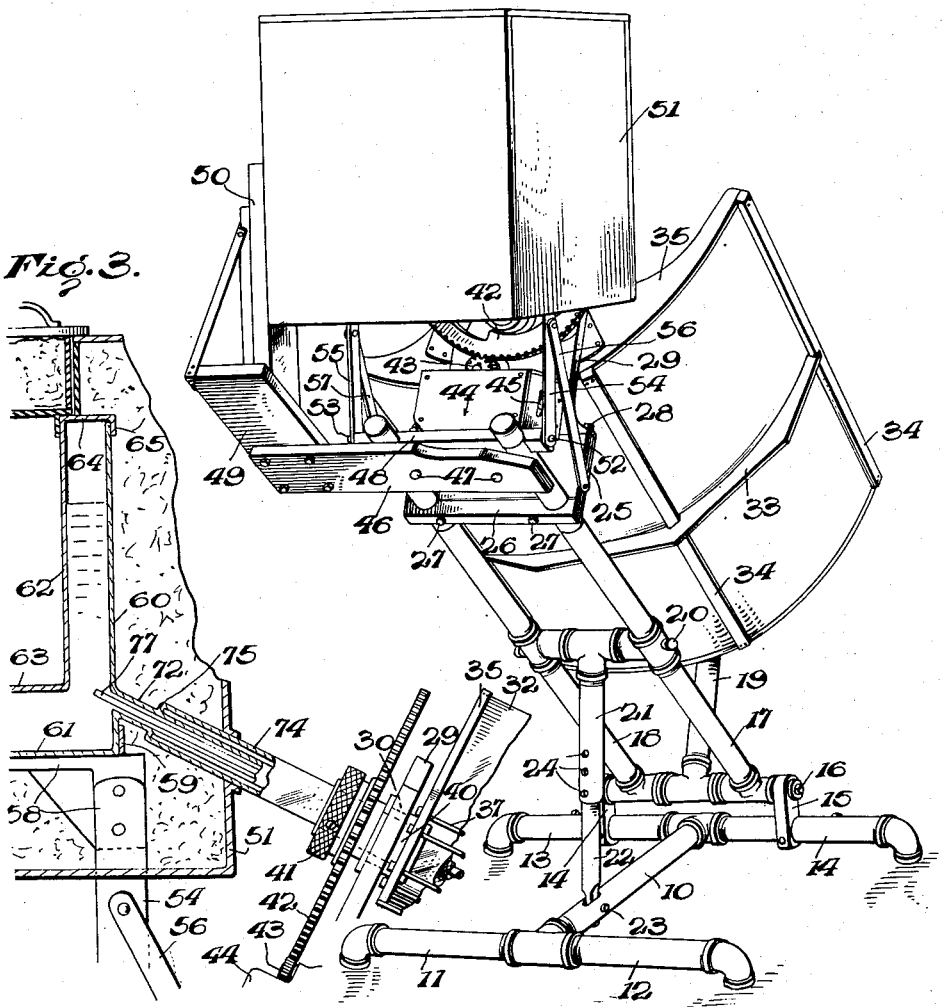
Fig. 3 is an enlarged detail partly in section of a part of Fig. 2 showing the junction of the heater element and heat utilizing element with details of both.

In these figures, in which like reference characters indicate corresponding parts, 10 is a base member of any suitable form and construction, here shown as provided at one end with laterally extending supporting legs 11 and 12 and at the other end with legs 13 and 14. Secured to legs 13 and 14 are uprights 14 and 15 respectively carrying therebetween a shaft or rod 16. Rotatively mounted on rod 16 are frame members 17 and 18. Likewise rotatively mounted on rod 16 between the frame members 17 and 18 is mirror support 19. Carried by frame members 17 and 18 is cross rod 20 having rotatively mounted thereon an adjustable elevating mechanism for said members 17 and 18, here shown as comprising a sleeve 21 having slidably mounted therein a rod 22 pivotally mounted in the base member 10 at 23 and secured with relation to sleeve 21 by set screws 24. Mounted across frame members 17 and 18, and partially cut away to receive them, is a platelike frame element 25 fixed in position on said frame members 17 and 18 by clamp member 26, which is likewise partially cut away to receive said frame members and secured to plate 25 by bolts or screws 27. Secured to plate 25 by bolts or screws 28 and lying in the plane thereof is bearing member 29 circularly cut away at 30 to receive any suitable bearing, preferably a ball or roller bearing. Mirror support 19 is provided with a thrust bearing screw 31 which lies in the center line extended of the circularly cut away portion 30 of member 29.

Rotatably mounted between mirror support 19 and bearing member 29 is mirror 32 made of any suitable material such as alcoa sheet on an aluminum base, mirror 32 having a concave cylindric form having the formula $y^2 = 36x$. Mirror 32 is reenforced by backing member 33 and longitudinal strips 34 suitably secured thereto and is provided with ends 35 and 36 spaced apart and rigidly held by tie rods 37. End 36 has suitably secured thereto and outwardly extending therefrom a bearing block 38 designed to engage the bearing screw 31 and provided with the counterweight 39. End 35 has secured thereto the hollow bearing block 40 designed to rotatably fit within the bearing in cut away portion 30 of bearing member 29. Ends 35 and 36 and bearing blocks 38 and 40 are so shaped and arranged that the focal line of mirror 32 coincides with the axis of rotation of the mirror. Suitably secured to bearing block 40 as by nut 41 is gear 42 designed to be engaged by a gear 43 of a clockwork mechanism 44 secured to plate 25 or bearing member 29 and provided with control means 45. Clockwork mechanism 44 and gears 42 and 43 are adapted to provide a rotary movement of mirror 32 at the rate of 15° per hour.

Spanning frame members 17 and 18 are frame members 46 and 48 secured thereto by bolts 47. Secured to one end of frame member 46 is an extension 49, and secured to said extension 49 is a suitable support 50. Suitably secured to support 50 is the outer casing 51 of a heat utilizing element assembly, said casing being made of any suitable metal such as aluminum and of any suitable size and shape. Secured to the ends of frame member 48 as by bolts or screws 52 and 53 are frame members 54 and 55 respectively passing upwardly through casing 51. Frame members 54 and 55 are fixed in place by braces 56 and 57 respectively. Secured to the ends of frame members 54 and 55 within casing 51 are the supports 58 of the heat utilizing unit. Resting on said supports 58 within casing 51, and suitably secured thereto as by flanges 59, is the outer casing of what is here shown as a cooker unit 60, preferably made of glass, cylindrical in form, open at the top and having an integral bottom 61. Mounted within casing 60 is the cooking chamber 62 made preferably of copper, cylindrical in form, having an integral bottom 63 and an out-turned annular flange 64 adapted to rest on the top of casing 60 where it is provided with a downturned annular flange 65 embracing the outer wall of casing 60 to thus secure chamber 62 in position in casing 60. The open end of cooking chamber 62 is adapted to be closed by a cylindrical cover 66 of non-conducting material passing through a suitable circular opening 67 in casing 51. Cover 66 has a bottom 67 to which is secured an annular flange 68 adapted to engage the inner wall of the cooking chamber 62 and has a top 69 of sufficient size to overlap the lateral wall around opening 67 and rest on casing 51 when cover 66 is in place. Any suitable handle 70 may be secured to top 69. A cylindrical partition 71 of suitable insulating material is preferably placed between the top of flange 64 and the underside of the top of casing 51 around the opening 67 and glass wool or other suitable insulating material is packed in the space between casing 51 and casing 60 and partition 71, the latter keeping the insulating material from entering the cooking chamber 62 when cover 66 is removed. Cylindrical cover 66 is also preferably packed with glass wool or other suitable insulating material.

Sealed to glass casing 60, as by a melted glass seal, and opening into the interior of casing 60 is glass tube 72 transparent to solar rays but opaque to rays emitted by bodies at moderate temperatures. Surrounding tube 72 is a larger tube 74 adapted to transmit solar rays and sealed at both ends to tube 72, as at 75, to form an air tight joint therewith. Tubes 72 and 74 pass through a suitably placed orifice 73 in casing 51 and extend through hollow bearing block 40 the length of mirror 32, and terminate in a suitably closed end adjacent the end 36 of mirror 32, the center line of tube 72 coinciding with the axis of rotation and the focal line of the mirror 32. The closed ends of tubes 72 and 74 abut the end 36 of mirror 32, an annular flange 76 preferably of soft material being suitably secured to end 36 of mirror 32 or block 38 to embrace tube 74 loosely and hold it and tube 72 in place. The space between tube 74 and tube 72 is evacuated. Mounted within tube 72 and extending into container 60, and terminating in an open end adjacent the closed end of tube 72, is a small tube 77 supported in tube 72 in any suitable way. Tube 72 with its contained tube 77 and the space between container 60 and cooking chamber 62 is nearly filled with a black liquid which is stable at high temperature and highly absorptive of solar rays, sufficient space being left unfilled to allow for an expansion of the liquid when heated of one quarter in volume. To cut down radiation from tube 72 about one fifth of its top circumference may be plated on the outside with suitable metal without deflecting solar rays focussed by mirror 32.

Referring now to Fig. 4, there is shown an embodiment of my solar heater, also shown as a cooker, having a larger cooking capacity than that just described with reference to Figs. 1–3. Such a cooker is preferably provided with sufficient heat carrying liquid and suitable insulation to conserve solar heat for several days of unfavorable weather. As is there shown a suitable outer casing 51 is provided of a size appropriate for receiving the inner steel casing 78, which may contain on the order of a barrel of high boiling point liquid, and providing space for suitable insulating material 79. One or more ovens 80 are mounted within casing 78 and open through the side of casing 51 where they are provided with suitably insulated covers 81 removably mounted on casing 51 to allow access to the ovens. In place of the glass tube 72 of the embodiment of Figs. 1–3, a blackened copper tube 82 is here used, said tube opening into container 78 and secured thereto by any suitable sealed connection 83, as for example by means of a highly compressed lead washer. Copper tube 82 is closed at its opposite end, and surrounding copper tube 82, in place of tube 74, is a glass vacuum jacket 84 which may be slipped thereover and supported therefrom in any suitable way. Mounted within copper tube 82 is a smaller glass or metal tube 77 similar to and used for the same purpose as the tube 77 of Figs. 1–3. In this embodiment the liquid in container 78 and tubes 77 and 82 need not be absorptive of radiation but may be only stable at high temperatures as is say, cylinder oil.

The present invention may be embodied in solar heaters of a wide variety of sizes and employed for a wide variety of purposes. Not only may the heater be made of a size and capacity suitable for use as a family cooker, as in the embodiment of Fig. 4, or a cooker of smaller capacity as in the embodiment of Fig. 1, but it may be made of sufficiently small sizes to be suitable as a toy, the construction of Figs. 1–3 being particularly useful for this purpose, as it is a safe and yet effective device that may be employed on sunny days as a toy cooker. The glass casing 60 may also be adapted to contain a boiler, preferably a spiral closed copper tube surrounding the cooking oven 62, in which case if preferred the outlet tube may be passed through the heater tube 72 to superheat the vapor formed, and in any event the boiler so provided may be associated with any suitable form or character of steam driven or operated toys. The heated liquid from the heater element 72 may also be passed through the heater of a refrigerating device before returning in the tube 77, and the invention may be applied to many other uses, all as will now be apparent to those skilled in the art.

When using the embodiments of my novel solar heater above described the axis of symmetry of the above described apparatus is placed in a north south direction and the sleeve 21 so positioned on rod 22 as to place the axis of rotation and the focal line of mirror 32 parallel to the axis of the earth. Mirror 32 is then rotated until it catches the rays of the sun and focuses them on the tube 72 which lies in the focal line of mirror 32. Thereafter the clockwork mechanism 44 is started, rotating mirror 32 at the rate of 15° an hour, moving mirror 32 with the sun as the sun progresses across the heavens and keeping the rays of the sun constantly focused on tube 72. Focusing the sun's rays on tube 72 heats the liquid in tube 72, causing the liquid to expand and rise into casing 60 while the cooler liquid from casing 60 flows down tube 77 and takes the place of the heated liquid in tube 72, where it in turn is heated and rises into casing 60. Thus a simple and efficient circulating system for the heated and cooled liquid is provided. The temperature of the liquid in casing 60 surrounding the chamber 62 gradually rises as the circulation of the heated liquid continues and the heat therefrom is conducted through the walls of the chamber 62 where it may be utilized for cooking purposes, converting water into steam if the casing 60 is suitably adapted to contain a boiler, etc.

It will now be apparent that the present invention provides a novel solar heater in which the heat collected from solar rays is conducted to some distance to a heat utilizing element, the heat being conveyed by a heat absorbing liquid circulated to the heat utilizing element by expansion and returned therefrom by gravitation, and the solar rays being collected and focused on the heat absorbing liquid in a novel heater element which is simple in structure and highly effective and efficient in service. It will also be apparent that the solar cooker of the present invention is capable of being embodied in a wide range of sizes without loss of efficiency, and it is simple, compact, cheap to manufacture, durable and easily used by the inexperienced.

To those skilled in the art changes in or modification of the above described embodiments of my invention will be suggested and may be made without departing from the inventive concept thereof. Reference is therefore to be had to the appended claims to determine the scope of the present invention.

What is claimed is:

1. In a device for utilizing solar energy of the type wherein a ray absorptive liquid is circulated by convection between heat absorbing means and a reservoir for said liquid in heat-interchanging relationship with heat utilizing means, a heat absorbing element including a pair of tubes one arranged within the other and in communication at one end thereof, the outer of said tubes being closed at said end, the other ends of said tubes being open to provide for the inflow and outflow of said liquid, a third tube surrounding the outer of said tubes and sealed thereto adjacent the opposite ends thereof to provide an evacuated space therebetween, a reservoir for said liquid extending above and in communication with the open ends of both tubes of said pair to maintain said tubes full of said liquid, and means for concentrating solar rays upon said tubes to heat said liquid and circulate said liquid convectionally between said reservoir and said tubes.

2. In a device for utilizing solar energy of the type wherein a heat absorptive liquid is circulated by convection between heat absorbing means and a reservoir for said liquid in heat-interchanging relationship with heat utilizing means, a heat absorbing element including a pair of tubes one arranged within the other and in communication at one end thereof, the outer of said tubes being closed at said end, the other ends of said tubes being open to provide for the inflow and outflow of said liquid, a third tube surrounding the outer of said tubes and sealed thereto adjacent the opposite ends thereof to provide an evacuated space therebetween, the outer of said first named tubes and said third tube being formed of glass, a reservoir for said liquid extending above and in communication with the open ends of both tubes of said pair to maintain said tubes full of said liquid, and means for concentrating solar rays upon said tubes to heat said liquid and circulate said liquid convectionally between said reservoir and said tubes.

3. In a device for utilizing solar energy of the type wherein a heat absorptive liquid is circulated by convection between heat absorbing means and a reservoir for said liquid in heat-interchanging relationship with heat utilizing means, a heat absorbing element including a pair of tubes one arranged within the other and in communication at one end thereof, the outer of said tubes being closed at said end, the other ends of said tubes being open to provide for the inflow and outflow of said liquid, a third tube surrounding the outer of said tubes and sealed thereto adjacent the opposite ends thereof to provide an evacuated space therebetween, the outer of said first named tubes being of blackened metal and said third tube being of transparent material, a reservoir for said liquid extending above and in communication with the open ends of both tubes of said pair to maintain said tubes full of said liquid, and means for concentrating solar rays upon said tubes to heat said liquid and circulate said liquid convectionally between said reservoir and said tubes.

4. In a device for utilizing solar energy of the type wherein a ray absorptive liquid is circulated by convection between a ray absorbing means and a reservoir for said liquid in heat-interchanging relationship with heat utilizing means, a ray absorbing element including a double walled tube having its walls transparent and having an evacuated space between its walls, the inner of said walls containing said ray absorptive liquid, a tube communicating with the space within said inner wall, a reservoir for said liquid extending above and in communication with the space within said inner wall and with said last-named tube, and means for concentrating solar rays upon said double walled tube to heat said liquid.

5. In a self-contained unit for utilizing solar energy of the type wherein a heat absorptive liquid is circulated by convection between heat absorbing means and a reservoir for said liquid in heat-interchanging relationship with heat utilizing means, a unitary frame, a concave cylindric mirror mounted in said frame for rotation around its linear focus as an axis, means mounted on said frame and operatively connected to said mirror for rotating the same, a heat absorbing element mounted within said mirror in the linear focus thereof and including a pair of tubes arranged one within the other and in communication at one end thereof, the outer of said tubes being closed at said end, the other ends of said tubes being open to provide for the inflow and outflow of said liquid, a third tube providing an evacuated space around the outer of said tubes, a reservoir for heat absorptive liquid extending above and in communication with both tubes of said pair, said reservoir being entirely supported by said frame, and means also supported by said frame and associated with said reservoir for utilizing the heat of the liquid therein.

CHARLES G. ABBOT.